United States Patent [19]
Kehl et al.

[11] Patent Number: 4,832,417
[45] Date of Patent: May 23, 1989

[54] BRAKE SYSTEM

[75] Inventors: Georg Kehl; Heinz Siegel, both of Stuttgart, Fed. Rep. of Germany

[73] Assignee: Robert Bosch GmbH, Stuttgart, Fed. Rep. of Germany

[21] Appl. No.: 182,009

[22] Filed: Apr. 15, 1988

[30] Foreign Application Priority Data

Jun. 24, 1987 [DE] Fed. Rep. of Germany ....... 3724803

[51] Int. Cl.$^4$ .......................... B60T 13/10; B60T 15/00
[52] U.S. Cl. ...................................... 303/114; 60/591; 303/113; 303/115; 303/119
[58] Field of Search ............... 303/113, 114, 115, 116, 303/117, 119; 60/547.1, 555, 556, 561, 581, 591

[56] References Cited

U.S. PATENT DOCUMENTS 3,877,756  4/1975  Inada et al. ........................ 303/114
4,641,894  2/1987  Belart .................................... 60/591

FOREIGN PATENT DOCUMENTS 2051278  1/1981  United Kingdom .
2184506  6/1987  United Kingdom ............... 303/114

Primary Examiner—Andres Kashnikow
Assistant Examiner—Matthew C. Graham
Attorney, Agent, or Firm—Edwin E. Greigg

[57] ABSTRACT

A brake system having a master brake cylinder with at least one brake chamber, for at least one brake circuit, and a brake booster. The brake booster communicates via a servo pressure line with a reservoir or a pump for supplying pressure fluid, and a pressure reduction valve is incorporated into the servo pressure line. This pressure reduction valve has a connection on the other end, via a pressure line, to at least the one brake circuit. The pressure reduction valve can assume three switching positions. In a first position at normal brake pressure, the servo pressure line is open between the brake booster and the reservoir and/or pump. If a predetermined pressure is exceeded, the servo pressure line is closed, in a second position. If a further threshold pressure value is also exceeded, then the servo pressure line is connected to a return line, so that the brake booster can be bled.

23 Claims, 2 Drawing Sheets

BRAKE SYSTEM

BACKGROUND OF THE INVENTION

The invention relates to improvements in vehicle brake systems.

A brake system of this type is known from German Offenlegungsschrift No. 29 21 275, for example, which addresses the problem that the sum of the pedal force and servo force is always operative in a brake system having a brake booster. Very high brake pressures can arise in the individual brake circuits, especially in panic stops. The entire brake system must be dimensioned accordingly; that is, the individual brake circuits and the components belonging to them, such as the brake line and the wheel brake cylinders, must be capable of withstanding not only the high pedal pressures but also full boosting by the brake booster. This means a considerably greater consumption of material; in addition, the individual seals are subjected to considerable loads. German Offenlegungsschrift No. 29 21 275 has therefore already proposed pressure reduction valves, which come into play at the instant that excessively high pressures arise. The effect of these pressure reduction valves is that further feeding of the brake booster stops, and the brake booster is bled via a return line. Problems arise with the 3/2-way valves shown there, especially in terms of keeping them tight. It has also proved unfavorable to bleed the brake booster immediately upon switching on the pressure reduction valve, because this pumps brake fluid unnecessarily into the supply container, from which it has to be withdrawn again later by the pump.

OBJECT AND SUMMARY OF THE INVENTION

It is an object of the invention to provide a brake system as set forth using a pressure reduction valve that is capable of assuming three different switching positions. At normal brake pressure, the servo pressure line between the brake booster and the reservoir and/or pump for the power brake fluid is open. If the brake pressure exceeds a predetermined pressure, the pressure reduction valve is put into a second second switching position. In this position, the servo pressure line is interrupted, so that not only can the pump not pump new power brake fluid, but brake fluid cannot flow back out of the brake booster. This means that the servo force remains constant over a predetermined range and only the foot pedal force is operative.

If the foot pedal force also exceeds a further threshold pressure value, however, then the pressure reduction valve switches into a third position, in which the servo pressure line communicates with a return line. This bleeds the brake booster, resulting in a pressure reduction.

A control slide in an axial bore is provided for the three switching positions of the pressure reduction valve. This control slide is engaged on one end by a bolt that is subject to the pressure of the pressure line. On the other end, the control slide is supported against a compression spring. This compression spring is designed such that it does not yield and hence allow a displacement of the control slide until a predetermined pressure in the pressure line is exceeded.

In a preferred exemplary embodiment, the axial bore penetrates stepped cylinder, which is inserted into a stepped bore of the housing. For connection to the servo pressure line, the line to the pump or to the reservoir, the return line and the pressure line, respective radial bores are provided in the housing, which communicate, via a respective annular chamber formed by the stepped cylinder and stepped bore, or via a bottom chamber, with the axial bore. The bolt that acts on the control slide on the other side of the compression spring should preferably be disposed in the bottom chamber. Naturally the individual annular chambers or the bottom chamber are sealed off from one another by means of ring seals, so that an absolutely tight system is attained. This is one of the substantial advantages of the present invention.

The control slide also has two ring flanges, which between them define a connecting conduit. Via this connecting conduit, the servo pressure line communicates with the reservoir or the pump, in the normal position of the pressure reduction valve. The ring flanges are designed such that they slide in the axial bore. They are not sealed off from the axial bore, though, because that could cause an uncontrollable loss of friction. This presents the possibility that power brake fluid can escape via the two ring flanges into adjacent spaces. To prevent further leakage after that, however, a valve that is closed at normal brake pressure is provided between the control slide and the bolt. This valve preferably comprises a valve seat, embodied by a ring flange, which is struck by a ball. If the brake pressure rises beyond a predetermined value, the bolt strikes the ball and lifts it from its seat. This opens the valve space, located upstream of the ball and in which ring flange leaks might have caused power brake fluid to be located, so that these leaks can flow back to the return line located downstream of the valve.

At the same time, however, the first ring flange of the control slide overtakes the bore to the servo pressure line, or in other words to the brake booster, and closes it. This breaks the connection to the pump or to the reservoir.

If the brake pressure increases substantially beyond this, then the control slide finally fully overtakes the opening to the servo pressure line, or to the brake booster, connecting it with the valve chamber. Brake fluid can now flow back out of the brake booster into this valve chamber and flow through the valve seat to reach the return line to the supply container.

Opposite the valve, comprising the valve seat and the ball, the control slide merges after its second ring flange with a bolt section. This bolt section preferably has a diameter equivalent to that of the valve seat. This effects a balance of force in the entire valve assembly, so that no jumps in pressure occur when the valve seat opens Furthermore, a transverse bore penetrates the control slide from the valve chamber to the annular chamber surrounding the bolt section. This equalizes the pressure in the chambers upstream and downstream of the control slide.

This annular chamber downstream of the second annular flange is sealed off from the outside by a sealing ring. Thus, any leaks occurring here cannot escape through the second ring flange either.

The bolt section also meets a sliding bolt, which is encompassed by the compression spring and braced against it. Since under the pressure of the control slide this sliding bolt has to execute frequent axial movements, it should be guided by at least one guide.

By means of this pressure reduction valve according to the invention, an absolutely tight valve is obtained, which furthermore makes frequent refilling of the reservoir unnecessary.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
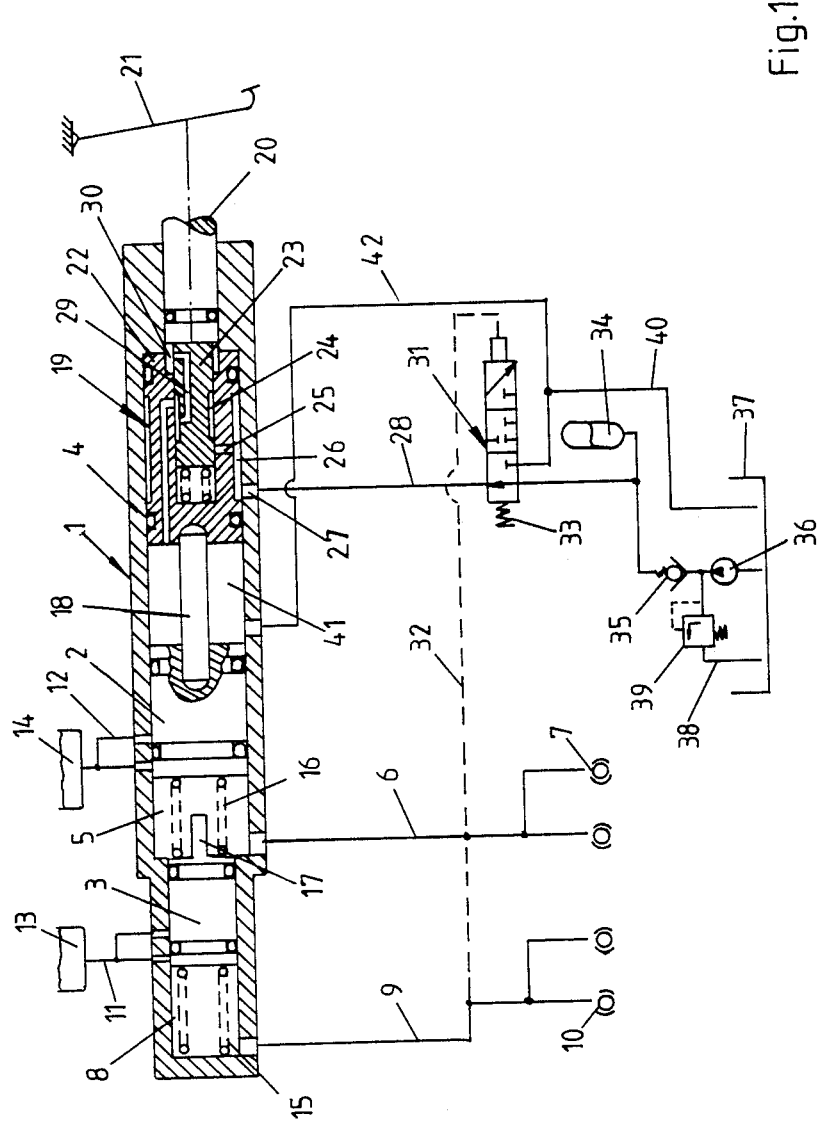
FIG. 1 is a block circuit diagram of a brake system, with a master brake cylinder shown in longitudinal section.

In a master brake cylinder 1 embodied as a stepped housing, two pistons 2 and 3 of different diameter are slidably disposed The larger piston 2, together with the smaller piston 3 and the housing 4 of the master brake cylinder, forms a first brake chamber 5 for a front axle brake circuit 6, the wheel brake cylinders 7 for which are shown only schematically.

The smaller piston, together with the housing 4, encloses a further brake chamber 8, from which the rear axle brake circuit 9 is supplied with brake fluid. Once again, the associated wheel brake cylinders 10 are shown only schematically.

The brake chamber 5 and the brake chamber 8 are supplied via supply lines 11 and 12, shown in simplified form, from separate supply containers 13 and 14.

The smaller piston 3 is supported in the brake chamber 8 via a helical spring 15 against the housing 4, on the other end, the piston acts upon a further helical spring 16, which is supported against one end of the larger piston 2. An emergency brake tappet 17 protruding from the piston 3 is supported against the piston 2. If the front axle brake circuit 6 should fail because of a leak, for example, then the piston 3 can still always be displaced mechanically by the piston 2 via the emergency brake tappet 17.

On the other side of the piston from the brake chamber 5, the piston 2 is connected via a pressure bar 18 with a known brake booster 19, which is engaged by a piston rod 20 that can be subjected to pressure from a brake pedal 21.

The brake booster 19 substantially has a servo piston 22 and a brake valve 23. In the present exemplary embodiment, this brake valve 23 is shown as a slide valve. If a brake pressure is transmitted via the brake pedal 21 onto the piston rod 20, the brake valve 23 is displaced to the left. In this process an annular chamber 24 overtakes a radial bore 25 in the servo piston 22 and makes a connection, via a further annular conduit 26 and a bore 27, with a servo pressure line 28. A suitable pressure fluid flows via this connection into the annular chamber 24, and from there via a connecting line 29 into a corresponding pressure chamber 30 downstream of the servo piston 22. A corresponding power brake pressure builds up in this pressure chamber 30, displacing the servo piston 22 to the left.

A pressure reduction valve 31 incorporated into the servo pressure line 28 is hydraulically controllable, via the pressure line 32. The pressure reduction valve 31 switches only if a pressure set by a compression spring 33 is exceeded. Before the set pressure is exceeded, the pressure reduction valve 31 is in the position shown in FIG. 1; that is, the servo pressure line 28 communicates with both a reservoir 34 and, via a check valve 35, a pump 36, which draws brake fluid from a supply container 37. A bypass 38 having a pressure limiting valve 39 is provided between the check valve 35 and the pump 36.

If the pressure in the pressure line 32 exceeds the value set at the compression spring 33, the pressure reduction valve 31 switches to its middle position. This disconnects the servo pressure line 28 from its pressure supply. Thus only the brake pressure exerted upon the brake pedal 21 becomes operative.

Should the pressure in the pressure line 32 continue to rise and exceed a further predetermined value, then the pressure reduction valve 31 switches to its third position, establishing communication between the servo pressure line 28 and a return line 40 to the supply container 37. Branching off from this return line 40 is a further line 42 to a chamber 41 between the piston 2 and the brake booster 19.

Figure 2:
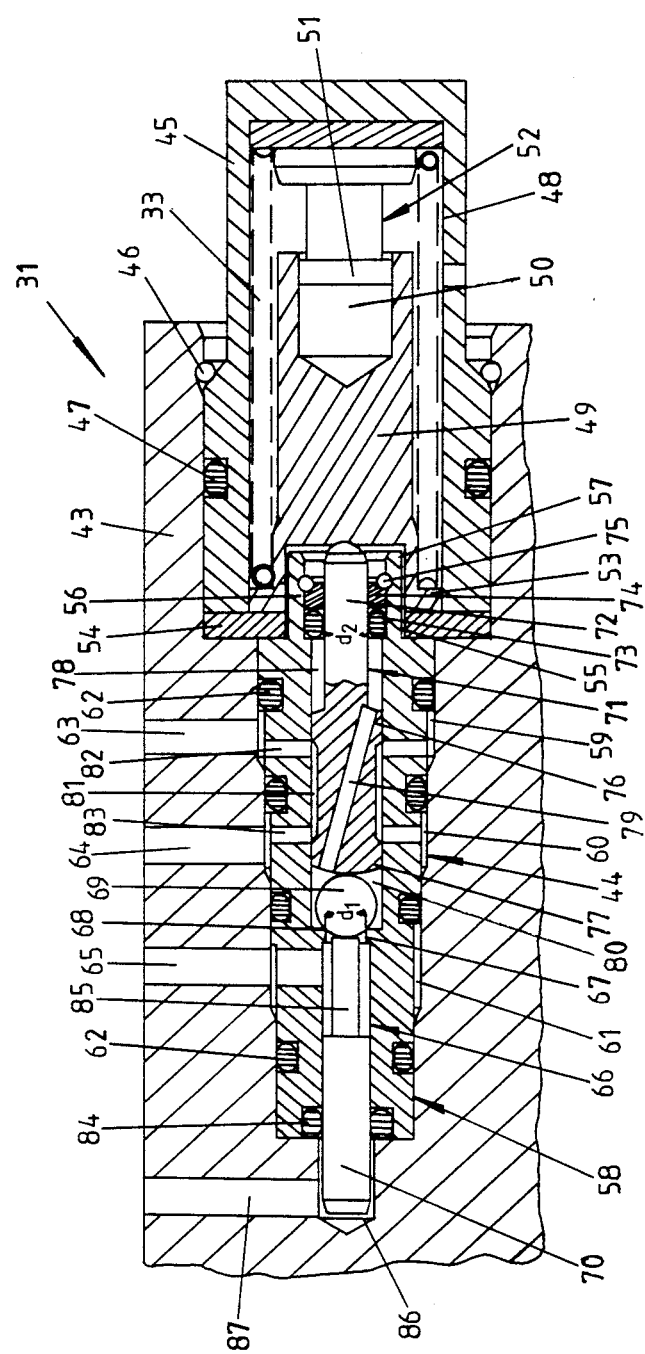
FIG. 2 is a fragmentary longitudinal section taken through a pressure reduction valve according to the invention.

As shown in FIG. 2, the pressure reduction valve 31 has a housing 43 with a stepped bore 44. An insert 45 is inserted into the first part of this stepped bore 44 and fixed via a snap ring 46. A suitable seal between the insert 45 and the housing 43 is indicated at 47.

Located in the insert 45 is a blind bore 48 for receiving the compression spring 33. This compression spring 33 surrounds a sliding bolt 49, which has an end bore 50 in which a piston 51 of a guide 52 slides. The compression spring 33 grips a collar 53, formed onto the sliding bolt 49, from underneath.

A perforated disk 54 rests on both the insert 45 and the collar 53; a sleeve extension 56 extends through the hole 55 of this perforated disk 54 and also engages an end recess in the sliding bolt 49. The sleeve extension 56 is part of a stepped cylinder 58, which together with the stepped bore 44 forms stepped annular chambers 59, 60 and 61. Suitable ring seals 62 are provided on both ends of each annular chamber 59, 60, 61.

The annular chamber 59 communicates via a radial bore 63 with the reservoir 34 or the pump 36. A radial bore 64 forms the connection to the servo pressure line 28 leading to the brake valve 23. The radial bore 65 provides communication with the return line 40.

By means of a ring flange 67, an axial bore 66 located in the stepped cylinder 58 forms a valve seat 68 for a ball 69. This ball 69 is seated between a bolt 70 and a control slide 71. Toward the right, the control slide 71 is supported against the sliding bolt 49 via a bolt section 72, which has a diameter $d_2$ equivalent to a diameter $d_1$ of the valve seat 68. A sealing ring 73, against which a disk 74 is supported on one end against a snap ring 75, surrounds the bolt section 72. This sealing ring 73 closes off the axial bore 66 on this side.

Two ring flanges 76 and 77, disposed spaced apart from one another, are formed onto the control slide 71, which slides via these flanges in the axial bore 66. The ring flange 76 and the sealing ring 73 enclose an annular conduit 78, which communicates via a transverse bore 79 with a valve chamber 80 in which the ball 69 rests.

Between the two ring flanges 76 and 77, a connecting conduit 81 is provided, which in the position of repose of the pressure reduction valve 31 connects the radial bore 63 to the reservoir 34 or pump 36 with the radial bore 64 to the servo pressure line 28, via corresponding bores 82 and 83.

The bolt 70 slides in the axial bore 66 in a sealed manner via a sealing ring 84 and with a pin 85 passes through the valve seat 68, meeting the ball 69. On the other end, it is seated in a bottom chamber 86, which communicates with the pressure line 32 via a radial bore 87.

The mode of operation of the pressure reduction valve according to the invention is as follows:

In normal braking, the control slide 71 is in the outset position shown in FIG. 2, in which the ball 69 seated in the valve seat 68 prevents leaks that could arise from the connecting conduit 81 through the ring flanges 76 or 77. In this outset position shown, the pressure reduction valve 31 is absolutely tight.

If the brake pressure now rises, for any reason whatever, beyond a desired extent, this increased brake pressure acts via the pressure line 32 and the radial bore 87 upon the bolt 70. The bolt 70 lifts the ball 69 from the valve seat 68 and displaces the control slide 71 against the sliding bolt 49, which in turn is subject to the pressure of the compression spring 33. In this process, the ring flange 77 overtakes the bore 83 and closes off communication between the radial bore 63 and the radial bore 64. This closes the servo pressure line 28. This means that over a predetermined range, the servo pressure in the brake booster 19 remains constant.

If the pressure in the pressure line 32 rises still further, the ring flange 77 completely overtakes the bore 83, causing it to communicate with the valve chamber 80. This means that the servo pressure line 28, via the valve chamber 80 and the valve seat 68, comes to communicate directly with the radial bore 65 to the return line 40.

Because the bolt section 72 has the same diameter $d_2$ as the valve seat 68, the valve assembly is balanced in terms of force, so that no jumps in pressure occur upon opening of the valve. In the same manner, the valve chamber 80 and the annular conduit 78 are equalized in pressure via the transverse bore 79.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake system comprising a master brake cylinder, said master brake cylinder including at least one brake chamber for at least one brake circuit and a brake booster (19), said brake booster communicating via a servo pressure line (28) with a fluid pressure means (34, 36) for supplying a pressure medium, a pressure reduction valve (34) being incorporated into said servo pressure line, said pressure reduction valve having at least one connection via a pressure line (32) with said at least one brake circuit, said pressure reduction valve including a first switching position operative at normal brake pressure with said servo pressure line (28) between said brake booster (19) and said fluid pressure means (34, 36), said pressure reduction valve being switchable to a second switching position if a predetermined pressure in the pressure line (32) is exceeded in order to close said servo pressure line (28), and said pressure reduction valve being further switchable to a third switching position if a threshold pressure value is exceeded, in which said servo pressure line (28) is made to communicate with a return line (40) to avoid an overpressure occurring in said at least one brake line.

2. A brake system as defined by claim 1, in which a control slide (71) is provided in an axial bore (66) and related to the three switching positions of said pressure reduction valve, said control slide being engaged on one side by a bolt (70) subject to the pressure of the pressure line (32) and on the other side by a compression spring (33) that exerts a predetermined counterpressure on said control slide.

3. A brake system as defined by claim 2, in which said pressure reduction valve includes a stepped cylinder (58) provided in a stepped bore (44) of a housing (43), said axial bore (66) penetrating said stepped cylinder, said housing including radial bores (63, 64, 65, 87) communicating respectively via annular chambers (59, 60, 61) and a bottom chamber (86) with the axial bore (66) and further connecting with connections to the servo pressure line (28), the line to the fluid pressure means (34, 36), the return line (40) and the pressure line (32).

4. A brake system as defined by claim 3, in which said annular chambers (59, 60, 61) and the bottom chamber (86) are sealed off from one another by means of ring seals (62).

5. A brake system as defined by claim 4, in which said servo pressure line (28) communicates with said fluid pressure means (34, 36) via a connecting conduit (81) formed between two ring flanges (76 and 77) on said control slide (71), said control slide (71) being arranged to slide with the ring flanges (76, 77) in said axial bore (66) supported against said axial bore.

6. A brake system as defined by claim 5, in which a control valve (68, 69) is disposed between said control slide (71) and said bolt (70) via which a connection between the servo pressure line (28) and the return line (40) to a supply container (37) can be established.

7. A brake system as defined by claim 6, in which said control valve comprises a valve seat (68), formed by a ring flange (67) in said axial bore (66), and a ball (69), which is contacted by said bolt (70).

8. A brake system as defined by claim 7, which further includes a valve chamber (80) disposed between the valve seat (68) and the control slide (71) for reception of said ball (69), said valve chamber communicating via a transverse bore (79) with an annular conduit (78) downstream of the ring flange (76).

9. A brake system as defined by claim 3, in which said servo pressure lines (28) communicates with said fluid pressure means (34, 36) via a connecting conduit (81) formed between two ring flanges (76 and 77) on said control slide (71), said control slide (71) being arranged to slide with the ring flanges (76, 77) in said axial bore (66) supported against said axial bore.

10. A brake system as defined by claim 9, in which a control valve (68, 69) is disposed between said control slide (71) and said bolt (70) via which a connection between the servo pressure line (28) and the return line (40) to a supply container (37) can be established.

11. A brake system as defined by claim 10, in which said control valve comprises a valve seat (68), formed by a ring flange (67) in said axial bore (66), and a ball (69), which is contacted by said bolt (70).

12. A brake system as defined by claim 11, which further includes a valve chamber (80) disposed between the valve seat (68) and the control slide (71) for reception of said ball (69), said valve chamber communicating via a transverse bore (79) with an annular conduit (78) downstream of the ring flange (76).

13. A brake system as defined by claim 2, in which said servo pressure line (28) communicates with said fluid pressure means (34, 36) via a connecting conduit (81) formed between two ring flanges (76 and 77) on said control slide (71), said control slide (71) being arranged to slide with the ring flanges (76, 77) in said axial bore (66) supported against said axial bore.

14. A brake system as defined by claim 13, in which a control valve (68, 69) is disposed between said control slide (71) and said bolt (70) via which a connection between the servo pressure line (28) and the return line (40) to a supply container (37) can be established.

15. A brake system as defined by claim 14, in which said control valve comprises a valve seat (68), formed by a ring flange (67) in said axial bore (66), and a ball (69), which is contacted by said bolt (70).

16. A brake system as defined by claim 15, which further includes a valve chamber (80) disposed between the valve seat (68) and the control slide (71) for reception of said ball (69), said valve chamber communicating via a transverse bore (79) with an annular conduit (78) downstream of the ring flange (76).

17. A brake system as defined by claim 16, in which said control slide (71) comprises a bolt section (72) disposed in the vicinity of the annular conduit (78), which bolt section has a diameter ($d_2$) substantially that of the diameter ($d_1$) of the valve seat (68).

18. A brake system as defined by claim 17, in which a sealing ring (73) surrounds said bolt section (72), which seals off the annular conduit (78) from the outside.

19. A brake system as defined by claim 18, in which said bolt section (72) contacts a sliding bolt (49), which is encompassed by and supported against said compression spring (33).

20. A brake system as defined by claim 19, which further includes a guide (52) that guides said sliding bolt (49) in an axial motion counter to the pressure of said compression spring (33).

21. A brake system as defined by claim 1, wherein said fluid pressure means is a pump (36).

22. A brake system as defined by claim 1, wherein said fluid pressure means is a reservoir (34).

23. A brake system as defined by claim 1, wherein said fluid pressure means is a reservoir (34) and a pump (36).

* * * * *